3,413,840
LEAK DETECTION SYSTEM
Norman K. Basile, Bronx, and Donald R. Yearwood, Brooklyn, N.Y., and Donald W. Brideweser, Montvale, N.J., assignors to John J. McMullen, Montclair, N.J.
Filed Apr. 19, 1966, Ser. No. 543,725
5 Claims. (Cl. 73—40)

ABSTRACT OF THE DISCLOSURE

A leak detector for liquefied gas storage tanks including temperature and pressure sensors located within a constant volume space about the tank. Leak conditions in the inner tank change the weight of gas in the space which affects the signals developed by the pressure sensor but which does not affect significantly those generated by the temperature sensor. The general seriousness of the leak is indicated by comparing the temperature and pressure sensor signals with each other.

---

The present invention relates to a leak detection system and more particularly to a system for indicating leaks within the walls of an enclosed constant volume tank. The present system is particularly applicable for detecting leaks into and out of the closed space between the inner and outer barriers of a double-walled tank or into and out of a closed space containing pipes, ducts or the like where the closed space is filled with gas.

Following the advance of the cryogenic arts, there is presently great activity in the sea transport of liquefied gas at about ambient pressures. Examples of such cargos are methane, propane, ethylene, and the like. But because of the volatile nature of the cargo, tankers carrying the same have a second backup or outer barrier spaced completely around the cargo tank in order to reduce the chance of explosion. The space between the inner and outer barrier is called the outer tank space and is normally filled with an inert gas or cargo gas.

Notwithstanding the secondary barrier, it is important to detect as early as possible leaks in the primary barrier so that precautionary measures can be taken. If it is determined that the leak is critical, the cargo in that particular tank can be dumped into the sea.

It is a purpose of the present invention to provide a leak detection system which monitors the conditions within the outer tank space of a liquefied gas storage tank and generates a visual indication of the conditions with this space. Since a leak in the inner tank causes a predetermined change in the monitored conditions, the system immediately indicates the presence of a leak as well as the magnitude of the leak.

It is the general practice to have a body of liquid cargo partially filling the inner tank with a cargo gas atmosphere filling the top portion of the tank. The outer tank space is also gas filled, but the pressure thereof is maintained slightly less than the cargo gas pressure within the tank. Due to the extremely cold cargo temperature, −160° C. in the case of methane, the gas in the outer gas space is cold, but because of the temperature gradients, the outer tank gas is slightly warmer than the liquid cargo and liquid cargo gas.

The system of the present invention senses the pressure within the outer tank space and feeds a corresponding signal to a plotter. In the event a leak occurs in the inner tank, the pressure of the outer tank space increases and the readings on the plotter vary accordingly. However, since pressure varies directly with temperature, this part of the system by itself cannot distinguish between a rise in pressure because of a leak in the inner tank and a rise in pressure resulting from a rise in temperature with no leak in the inner tank.

Therefore, the present system also includes an arrangement for sensing temperature within the outer tank and generating a calculated pressure which is then compared to the actual pressure sensed. In this way a comparative reading is generated at the plotter such that the reading gives a reliable indication of the leak conditions of the inner tank.

Therefore, it is an object of the present invention to provide a leak detection system for a double-walled liquefied gas storage tank in which the pressures inside the tank are different from the pressures in the outer tank space. The system generates a standard calculated pressure which is determined by sensing temperature in the outer tank space and sensing and generating the real pressure within this space. The calculated standard and actual pressures are compared and a reading is generated which is relative to the leak conditions of the tank.

Other and further objects will become apparent with the following detailed description when taken in view of the appended drawings in which.

Figure 1:
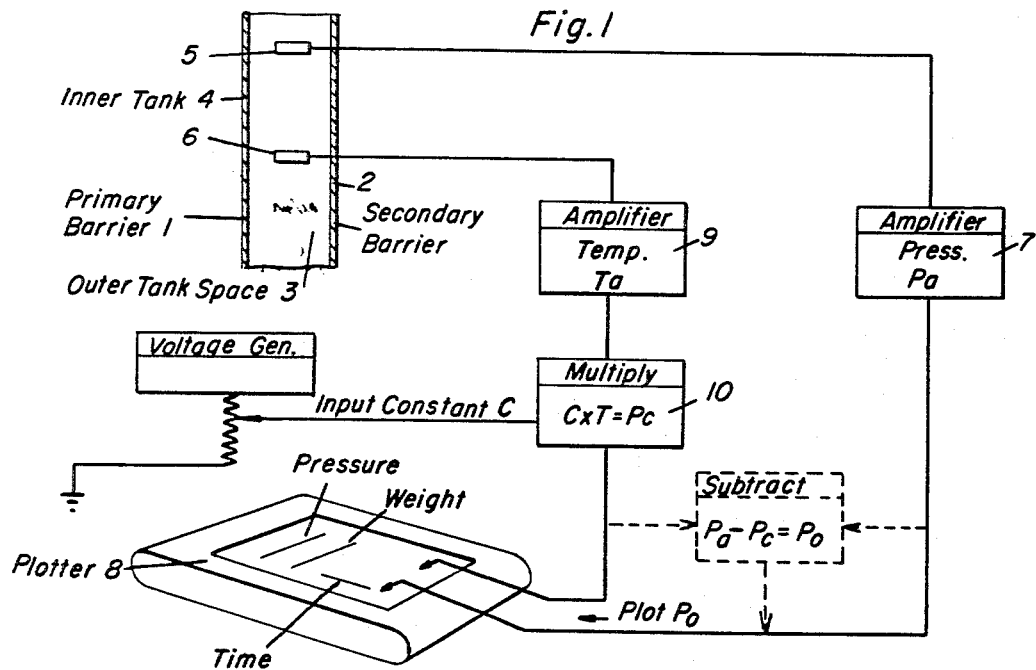
FIGURE 1 is a schematic diagram of one form of the present invention.
Figure 2:
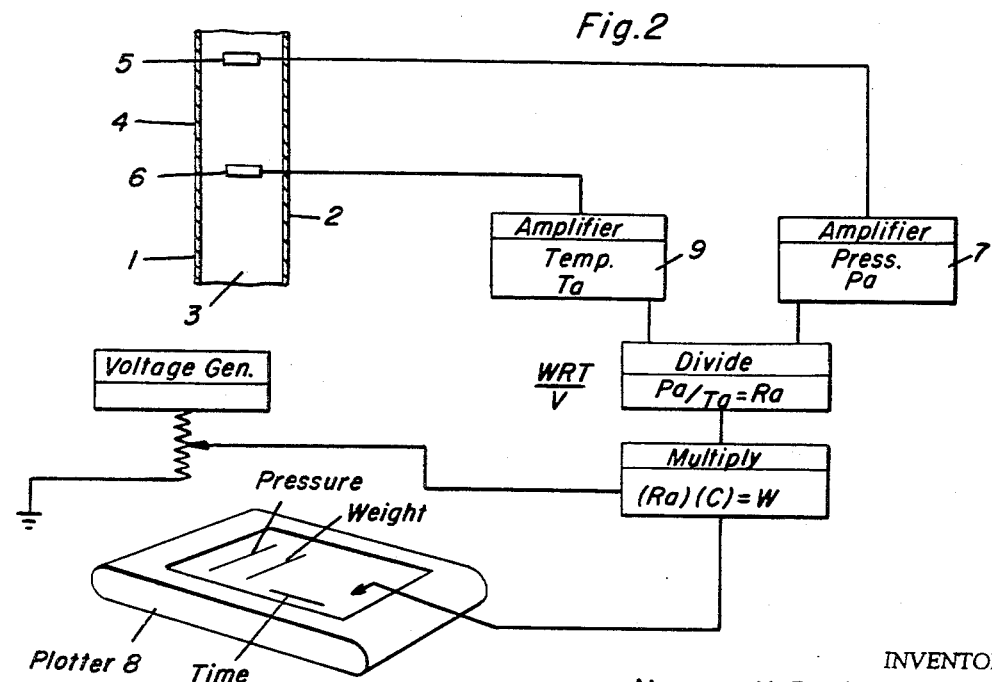
FIGURE 2 is a schematic diagram of an alternate form of the present invention.

With reference to the drawings, in detail, a primary barrier 1 contains liquefied methane and methane vapor in the tank 4 at about −258° F. with a normal operating vapor pressure of 16.1 p.s.i.a. A secondary barrier 2 is used as a back-up to contain the cargo in the event of failure of the primary barrier. The space between the barriers, known as the outer tank space 3, is filled with an inert gas or gaseous phase cargo.

After the tank has been tested, and the primary and secondary barriers have been found to be free of leaks, the tank 4 and barrier space 3 are purged of air, inerted, and cooled down using methane. After the cool down process is complete, a methane vapor atmosphere will be locked in this space at a pressure below the tank pressure. At this time, the initial tank pressure $P_i$ and initial tank temperature $T_i$ may be measured by conventional or automatic means. The gas in the outer tank may be described by the general equation $PV=WRT$. This may be rewritten as $P=WRT/V$ where P = gas pressure
W = gas weight, which is *constant* once the gas is locked in without leakage
R = gas *constant* for methane
V = outer tank volume, which is *constant* for a given configuration
T = gas temperature.

It can be seen that the expression $WR/V$ is constant for this tank when there is no leak. This constant may be computed either by using the initial value $T_i$ and $P_i$ to solve for W in the general equation and then substituting W in the expression $WR/V$ and computing the constant, or simply by determining the ratio $T_i/P_i$ since $$\frac{T_i}{P_i} = \frac{W_iR}{V}$$

Alternately, the constant may simply be set to achieve an initial deviation, defined as zero, between the actual pressure and calculated pressure with no knowledge of the value of the real constant.

A pressure transducer 5 is provided to sense actual pressure in the outer tank and generate a proportional electrical signal. The output from this transducer is fed through amplifier 7 to plotter 8 and recorded on a time scale.

A temperature transducer 6 is also provided to sense the actual temperature of the gas in the outer tank and generate a proportionate electric signal. The output from this transducer is amplified by amplifier 9 and fed to a small computer circuit 10. This circuit converts the electrical signal, that is proportionate to temperature, to one proportionate to a calculated pressure for the initial weight of methane in the outer tank by multiplying the temperature by the previously computed constant, $WR/V$ or C. This computed pressure is then plotted on a time scale and acts as a standard against which the plotted actual pressure is compared.

If the weight of gas in the outer tank remains constant then both plots of pressure vs. time will be identical. This is true even if temperature in the outer tank space varies because temperature is a parameter common to the calculated standard *and* the actual pressure. If, however, a leak occurs in the primary barrier, the actual pressure ($P_a$) will increase, since $P_a = WRT/V$ and W will be increasing, RT and V remaining constant. The calculated pressure ($P_c$), however, will remain constant since $P_c = CT$ and C is a function of the original weight of gas and T will not substantially change. The vertical distance between the two plots will be proportionate to the weight of the leaked gas since:

$$P = P_a - P_c$$

$$P = \frac{WaRT}{V} - \frac{WcRT}{V}$$

Since R, T and V are constant $$P = CWa - CWc$$
$$P = C(Wa - Wc)$$
$$P/C = (Wa - Wc)$$

Thus, the ordinate of the graph may be in units of pressure and/or units of weight.

This leak detection system will be unaffected by any change in temperature of the gas in the barrier due to a change in ambient temperature, tank level, etc. since the computed pressure, $P_c$, is for a given weight at the actual temperature in the barrier. Thus, since actual temperature is a common factor in the actual and calculated terms, it can be treated as a constant without introducing errors into the final readings.

In lieu of plotting $P_a$ and $P_c$ on a time scale, the difference between these two values may be computed and plotted. When the difference is zero, there is no leak. Any difference plotted will be proportionate to the weight of methane leaked.

In lieu of plotting $P_a$ and $P_c$ or the difference in pressure these values may be compared against constants in a memory device using a conventional "data logger" and any deviation may be plotted or printed out.

In another embodiment of the present invention, actual temperature and pressure is sensed and the weight of methane in the barrier space is computed:

$$W = PV/RT$$

since V and R are constant $$W = \frac{P}{T}C$$

This value may be plotted or compared for a deviation. Again any deviation from a defined "zero" will be proportionate to the weight of leaked methane.

Thus, there has been described a system for quickly and accurately detecting the presence and magnitudes of leaks in the barriers of a duble-walled tank.

It will be appreciated that the system of the present invention distinguishes leaks in the secondary barrier provided that the pressure in the outer tank space is greater than the pressure in the space outside the secondary barrier. With this arrangement, leaks in the secondary barrier result in a negative reading on the plotter.

In order to determine the liquid level in the outer tank space resulting from major leaks, a conventional liquid level indicator may be provided at or near the bottom of the outer tank.

It should be understood that various modifications can be made to the herein disclosed examples of the present invention without departing from the spirit and scope thereof.

What is claimed is:

1. A leak detection system to detect leaks into and out of a constant volume space, the system comprising first means for sensing the pressure in the space and generating a first signal corresponding thereto, second means sensing the temperature in the space and generating a second signal proportionate to a value corresponding thereto, third means for comparing the first and second signals and indicating the results of the comparison such that the indication corresponds to the leak conditions within the space, and wherein said second means generates the second signal such that it corresponds to a calculated pressure. wherein the third means includes indicating means which renders an indication such that differences in the first and second signals can be determined and such that there is a defined zero difference in the signals when there is no leak into or out of the space and there is other than a zero difference in the signals when there is a leak into or out of the space and wherein said second means includes means for generating a constant third signal corresponding to the weight and type of gas initially within the space, means for generating a fourth signal corresponding to the temperature within said space and said second means further including means for multiplying the third signal by said fourth signal to generate said second signal.

2. A system as set forth in claim 1 wherein said indicating means indicates the magnitudes of the leaks by indicating the magnitudes of the differences of said first and second signals.

3. A system as set forth in claim 1 wherein said indicating means comprises subtracting means receiving the first and second signals, subtracting one from the other, and generating a fifth signal corresponding to the difference between the first and second signals and feeding the fifth signal to an indicator.

4. A leak detection system to detect leaks into and out of a constant volume space, the system comprising first means for sensing the pressure in the space and generating a first signal corresponding thereto, second means sensing the temperature in the space and generating a second signal proportionate to a value corresponding thereto, third means for comparing the first and second signals and indicating the results of the comparison such that the indication corresponds to the leak conditions within the space and wherein said third means receives said first and second signals and generates a third signals corresponding to a ratio of said first and second signals and indicating means receiving the third signal and indicating the deviation of the third signal from a predefined "zero" value.

5. A method of detecting leaks in the constant volume outer tank space of a double-walled, liquefied gas storage tank in which liquefied gas at about ambient pressure is maintained in the inner tank, and the outer tank space is filled with gas at a pressure different from the first-mentioned pressure, the method comprising sensing the pressure in the outer tank space and generating a first signal corresponding thereto, sensing the temperature within the outer tank space and generating a second signal corresponding thereto, comparing the first signal with a signal proportionate to the second signal and indicating the results of the comparison such that the results correspond to the leak conditions within the outer tank space and wherein the step of comparing includes dividing one of the first and second signals by the other and generating a third signal proportionate to the ratio which is then compared to a predefined zero value.

References Cited

UNITED STATES PATENTS

| | | | |
|---|---|---|---|
| 2,040,285 | 5/1936 | Tietz et al. | 73—40.5 |
| 2,924,965 | 2/1960 | Westerheim | 73—40 |
| 3,012,432 | 12/1961 | Moore et al. | 73—40 |
| 3,046,369 | 7/1962 | Hicks | 73—49.3 X |

S. CLEMENT SWISHER, *Primary Examiner.*

J. NOLTON, *Assistant Examiner.*